United States Patent
Kim et al.

(10) Patent No.: US 11,332,159 B2
(45) Date of Patent: May 17, 2022

(54) METHOD FOR PROVIDING TRANSPORTATION SERVICE USING AUTONOMOUS VEHICLE

(71) Applicant: LG ELECTRONICS INC., Seoul (KR)

(72) Inventors: Joong Hang Kim, Seoul (KR); Sung Hwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 16/490,501

(22) PCT Filed: Mar. 21, 2019

(86) PCT No.: PCT/KR2019/003323
§ 371 (c)(1),
(2) Date: Aug. 30, 2019

(87) PCT Pub. No.: WO2020/189832
PCT Pub. Date: Sep. 24, 2020

(65) Prior Publication Data
US 2021/0331702 A1    Oct. 28, 2021

(51) Int. Cl.
*B60W 60/00* (2020.01)
*G01C 21/34* (2006.01)
(Continued)

(52) U.S. Cl.
CPC ..... *B60W 60/0025* (2020.02); *G01C 21/3407* (2013.01); *G01C 21/3691* (2013.01);
(Continued)

(58) Field of Classification Search
None
See application file for complete search history.

(56) References Cited

U.S. PATENT DOCUMENTS 10,466,057 B1 *  11/2019  Schwie ............... G06N 20/00
2017/0102700 A1   4/2017  Kozak
(Continued)

FOREIGN PATENT DOCUMENTS

JP    2008290680    12/2008
JP    2018156641    10/2018
(Continued)

OTHER PUBLICATIONS

PCT International Application No. PCT/KR2019/003323, International Search Report dated Dec. 20, 2019, 4 pages.
(Continued)

*Primary Examiner* — Abdhesh K Jha
*Assistant Examiner* — Sophia Antonia Skipper
(74) *Attorney, Agent, or Firm* — Lee, Hong, Degerman, Kang & Waimey PC

(57) ABSTRACT

Disclosed herein is a method for providing pickup and drop-off services to a user at designated locations using an autonomous vehicle. The method for providing transportation services using an autonomous vehicle according to an embodiment includes receiving driving information from a user terminal and identifying a destination on the basis of the received driving information, generating a driving path to the destination and transmitting the generated driving path to the autonomous vehicle, identifying a stopping area corresponding to the destination when the autonomous vehicle is within a preset distance from the destination and determining whether stopping is allowed in the identified stopping area, and generating a driving path to the stopping area on the basis of results of the determination, and transmitting the generated driving path to the autonomous vehicle, or setting a waiting area on the driving path to the destination, generating a driving path to the set waiting area, and transmitting the generated driving path to the autonomous vehicle.

16 Claims, 14 Drawing Sheets

(51) Int. Cl.
    *G01C 21/36*     (2006.01)
    *G01S 19/42*     (2010.01)
    *G06Q 50/30*     (2012.01)
    *G08G 1/0968*     (2006.01)

(52) U.S. Cl.
    CPC .............. *G01S 19/42* (2013.01); *G06Q 50/30* (2013.01); *G08G 1/0968* (2013.01); *B60W 2420/42* (2013.01); *B60W 2556/65* (2020.02)

(56) References Cited

U.S. PATENT DOCUMENTS

| | | | |
|---|---|---|---|
| 2017/0241796 A1 | 8/2017 | Wakayama et al. | |
| 2017/0370734 A1 | 12/2017 | Colijn et al. | |
| 2018/0113463 A1* | 4/2018 | Iagnemma | G01C 21/3407 |
| 2018/0147988 A1 | 5/2018 | Lee et al. | |
| 2019/0064808 A1* | 2/2019 | Dyer | B60W 10/06 |
| 2019/0137290 A1* | 5/2019 | Levy | G01C 21/3461 |
| 2019/0272483 A1* | 9/2019 | Hiray | G06Q 10/02 |
| 2020/0001789 A1 | 1/2020 | Leem et al. | |
| 2020/0247430 A1* | 8/2020 | Rao | G01C 21/3438 |
| 2021/0088341 A1* | 3/2021 | Macneille | G06Q 50/30 |

FOREIGN PATENT DOCUMENTS

| | | |
|---|---|---|
| KR | 1020120045172 | 5/2012 |
| KR | 1020170142210 | 12/2017 |
| KR | 1020180008593 | 1/2018 |
| KR | 20180060602 | 6/2018 |
| WO | 2016079966 | 8/2017 |
| WO | 2016183525 | 10/2018 |

OTHER PUBLICATIONS

Korean Intellectual Property Office Application No. 10-2019-7019823, Office Action dated Nov. 30, 2020, 6 pages.

* cited by examiner

[FIG. 1]
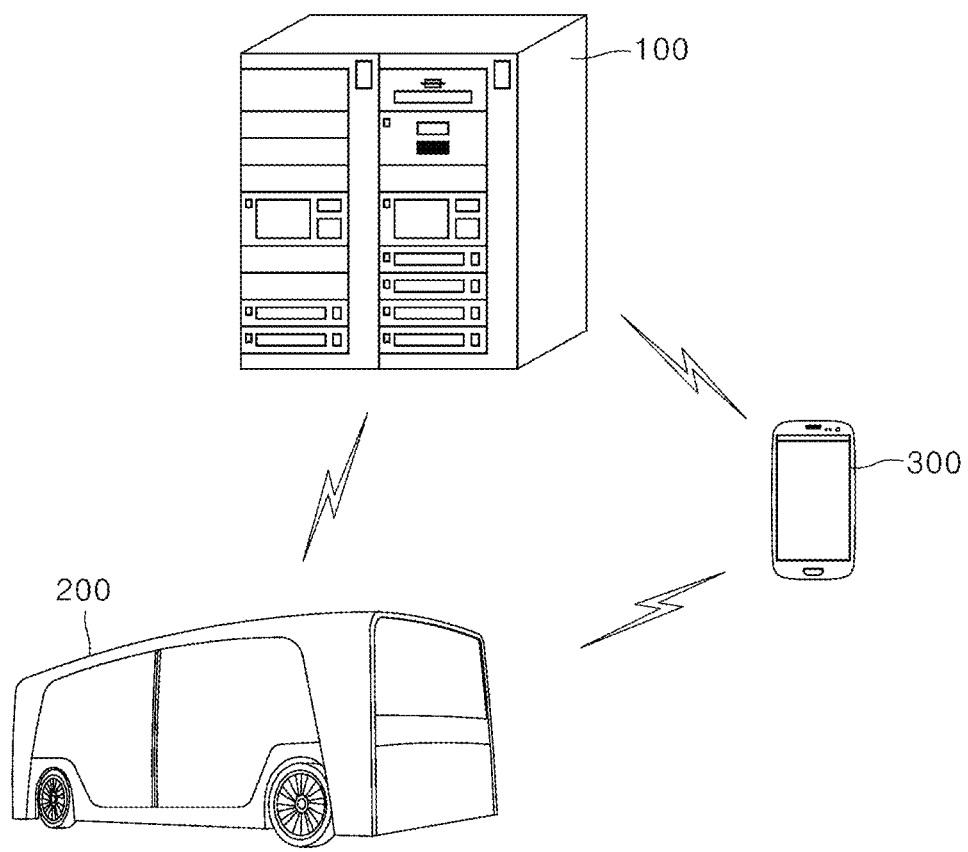

[FIG. 2]
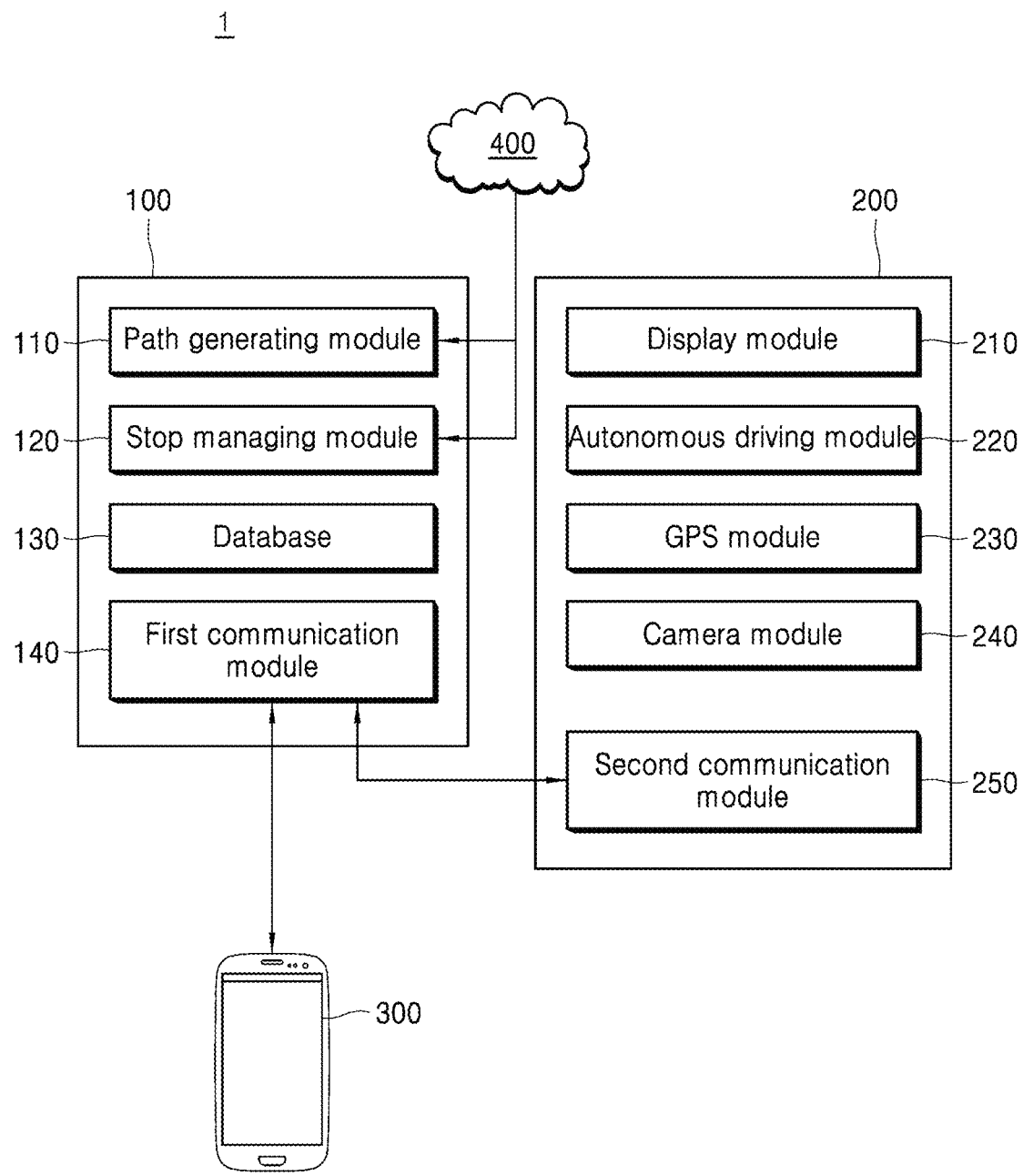

[FIG. 3]
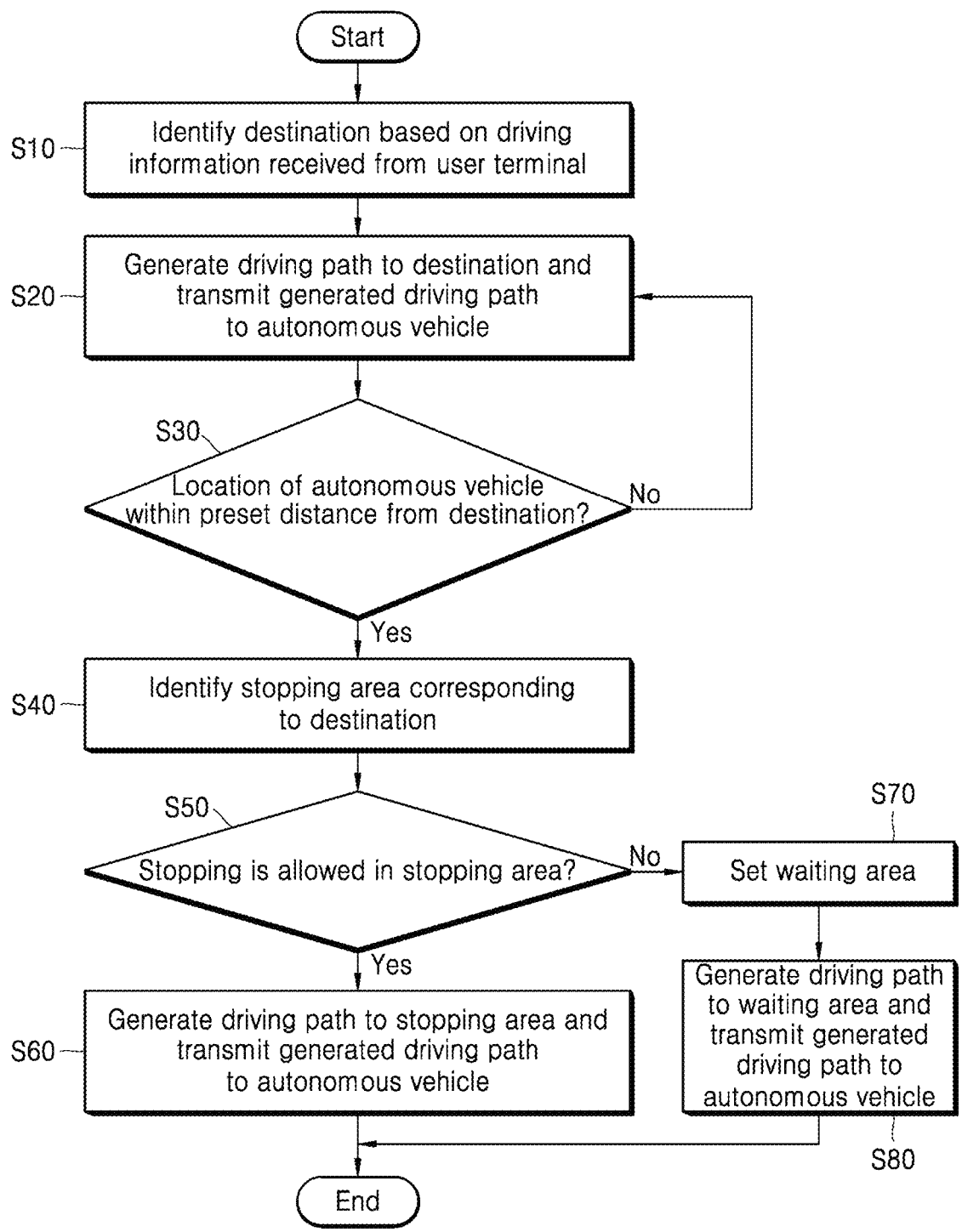

[FIG. 4]
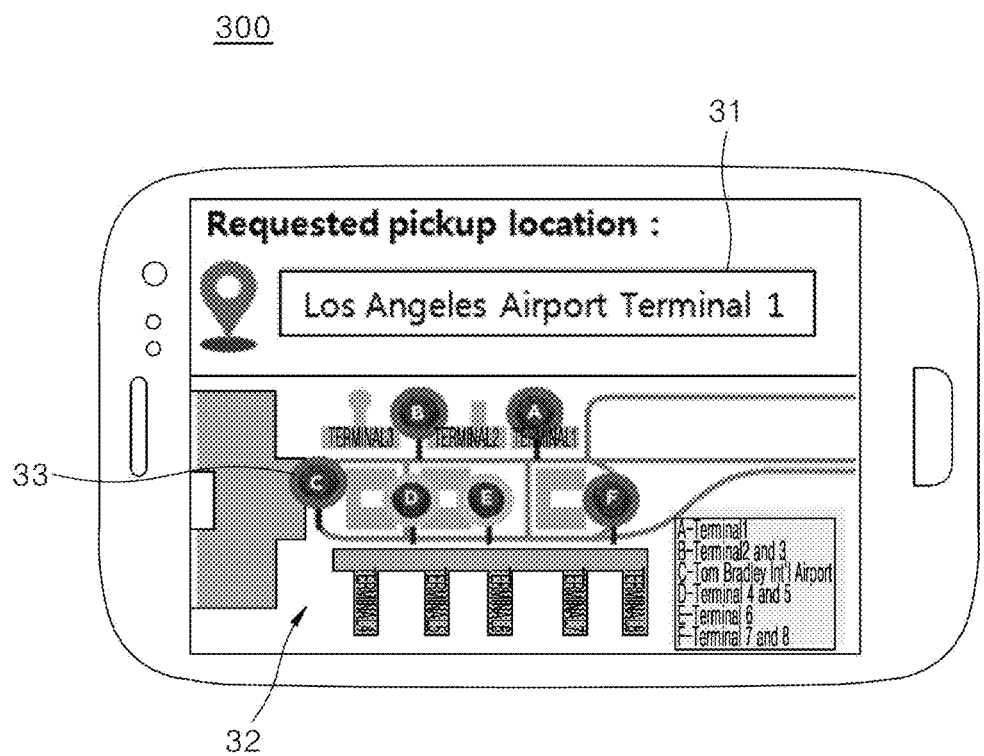

[FIG. 5]
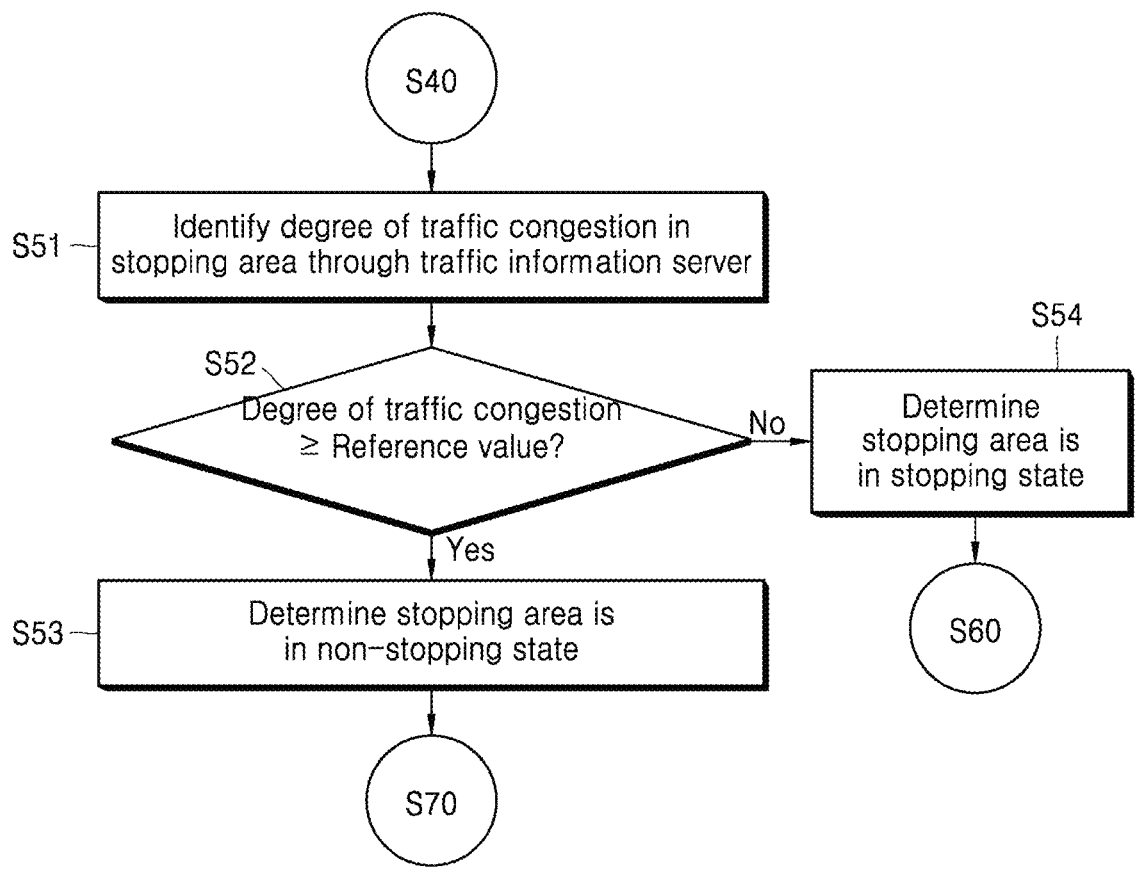

[FIG. 6]
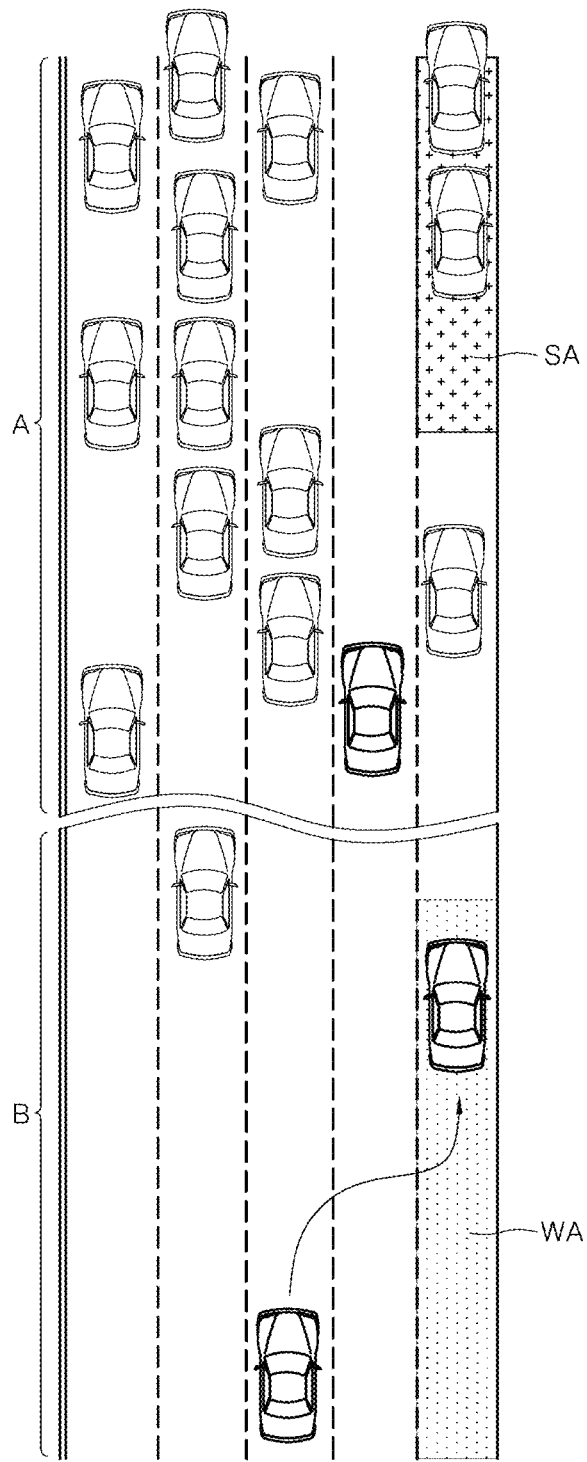

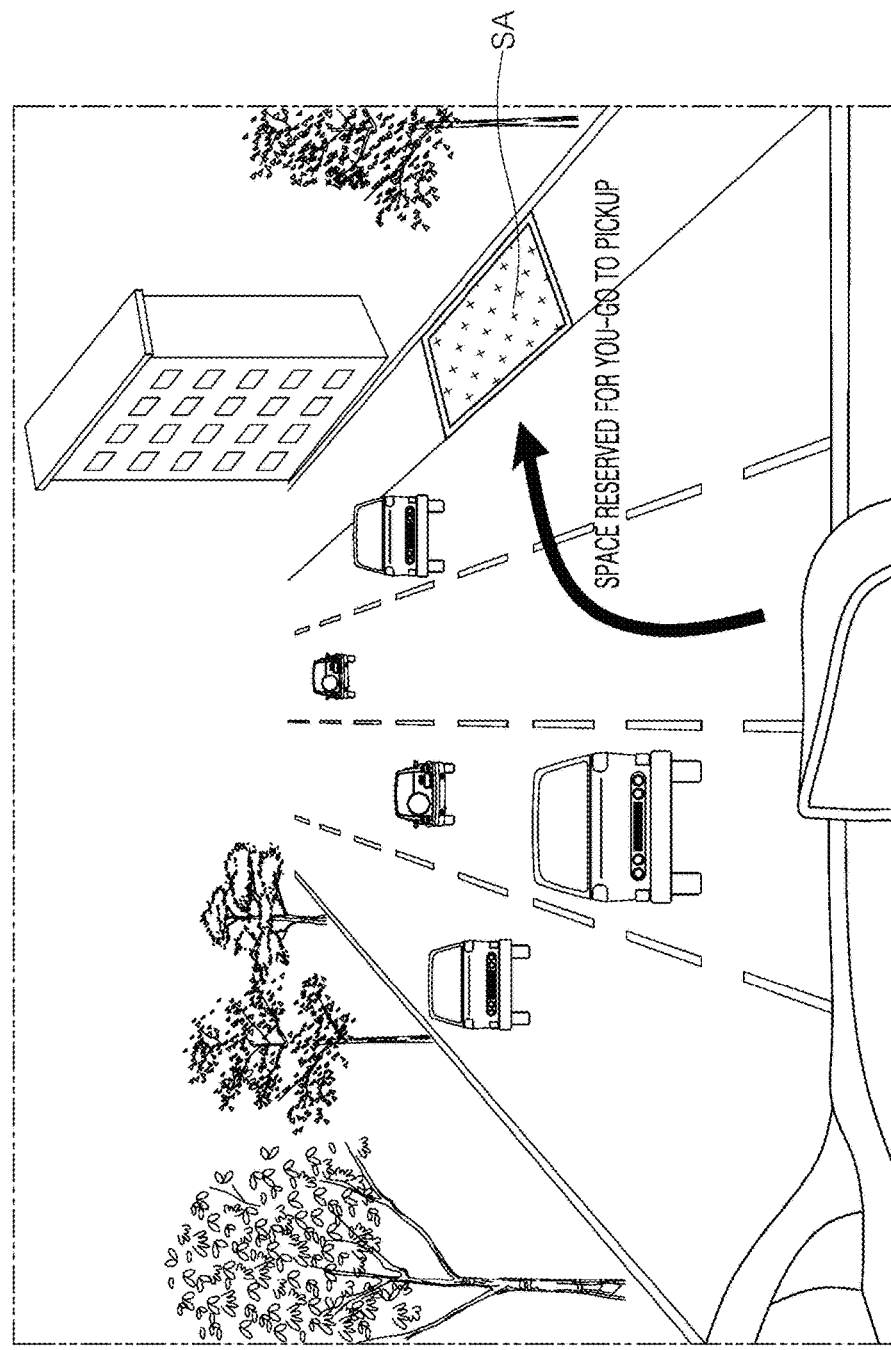
[FIG. 7]

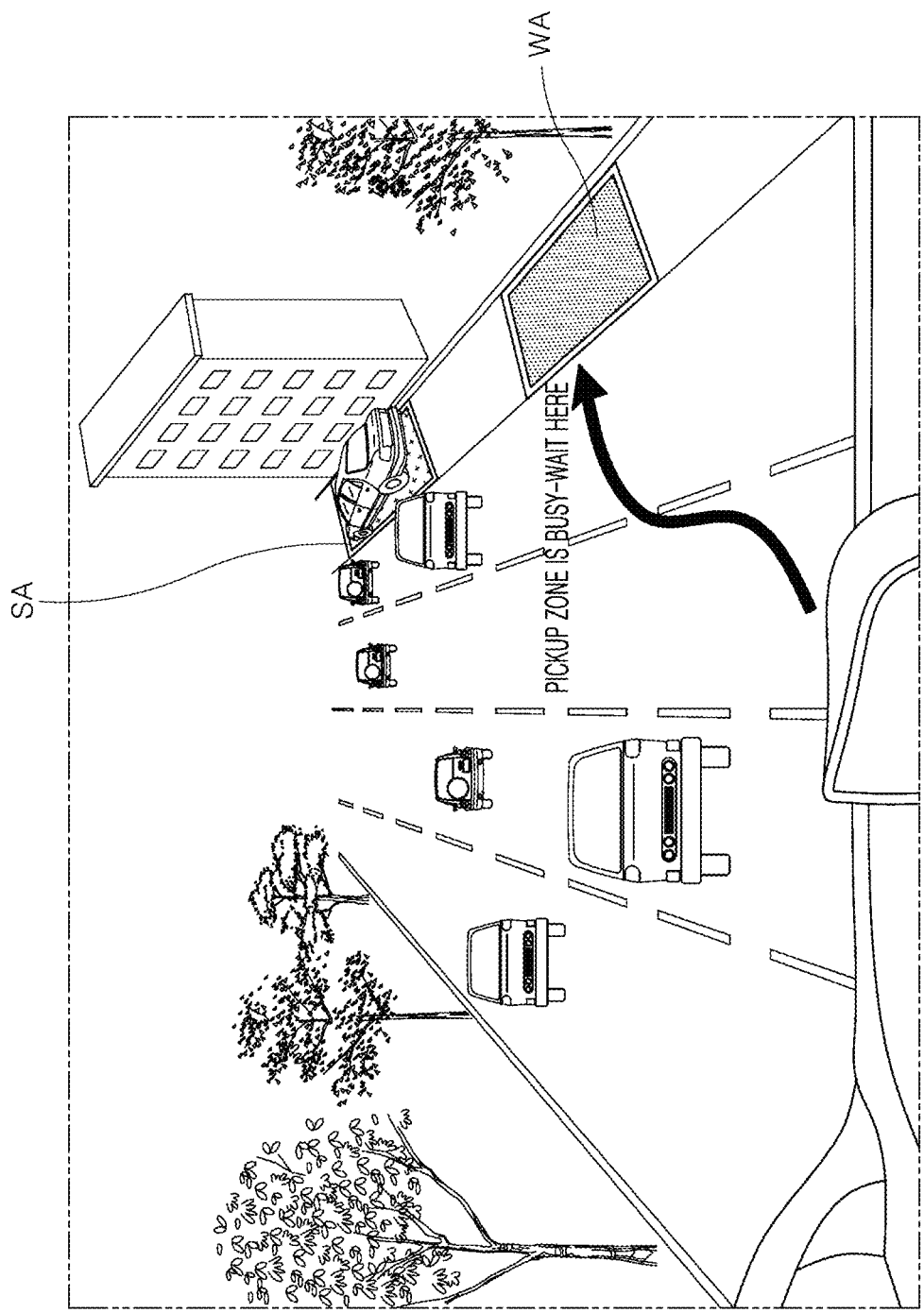
[FIG. 8]

[FIG. 9]
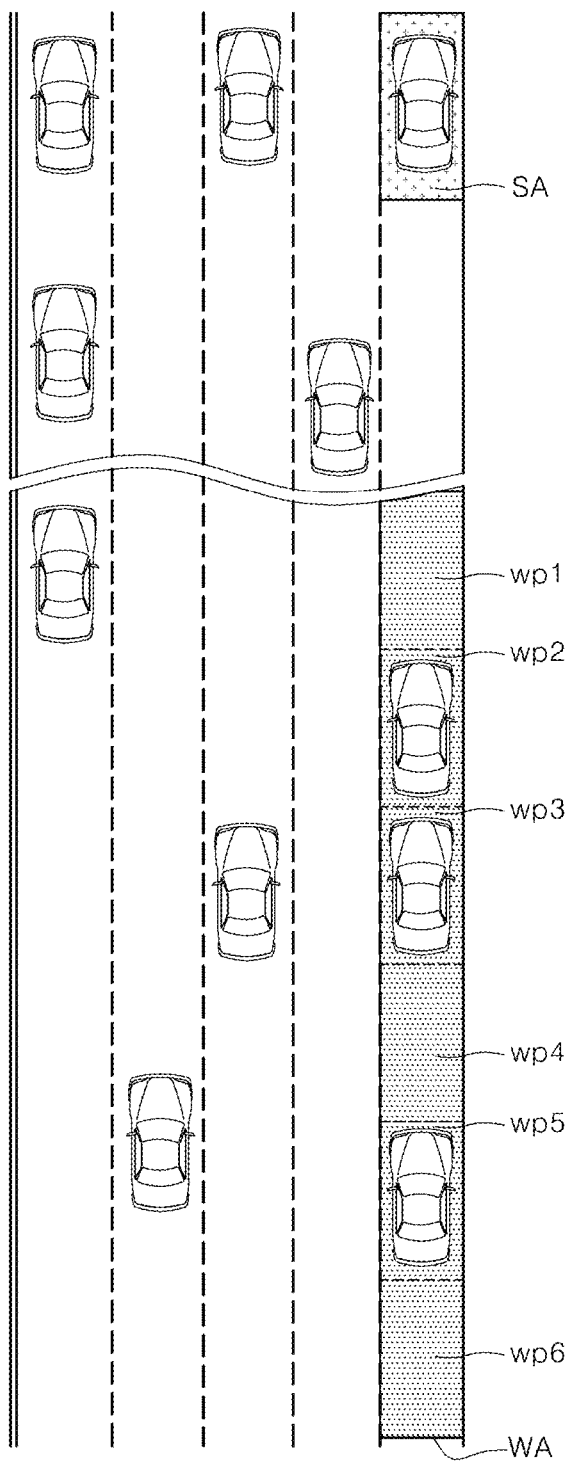

【FIG. 10】
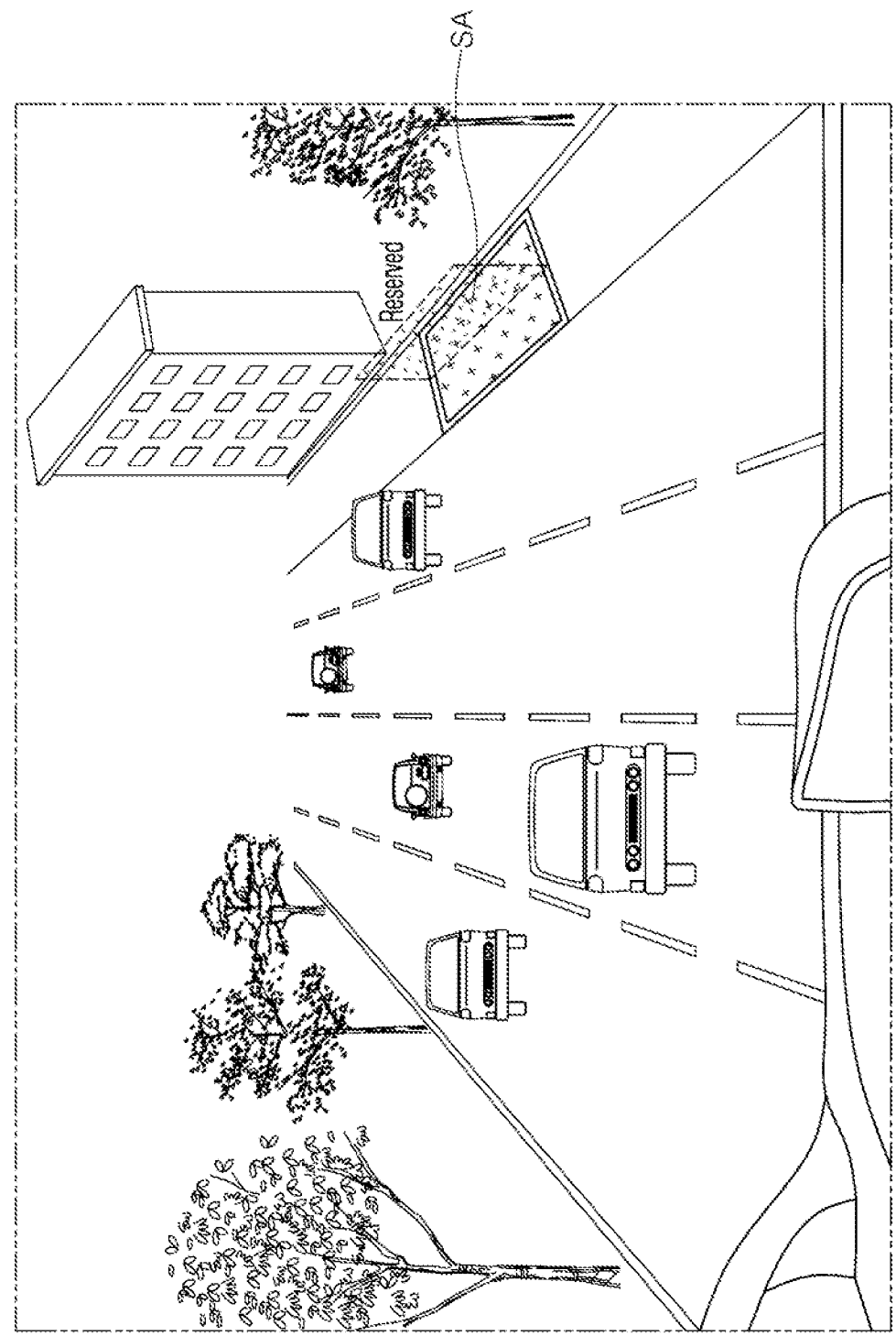

[FIG. 11]
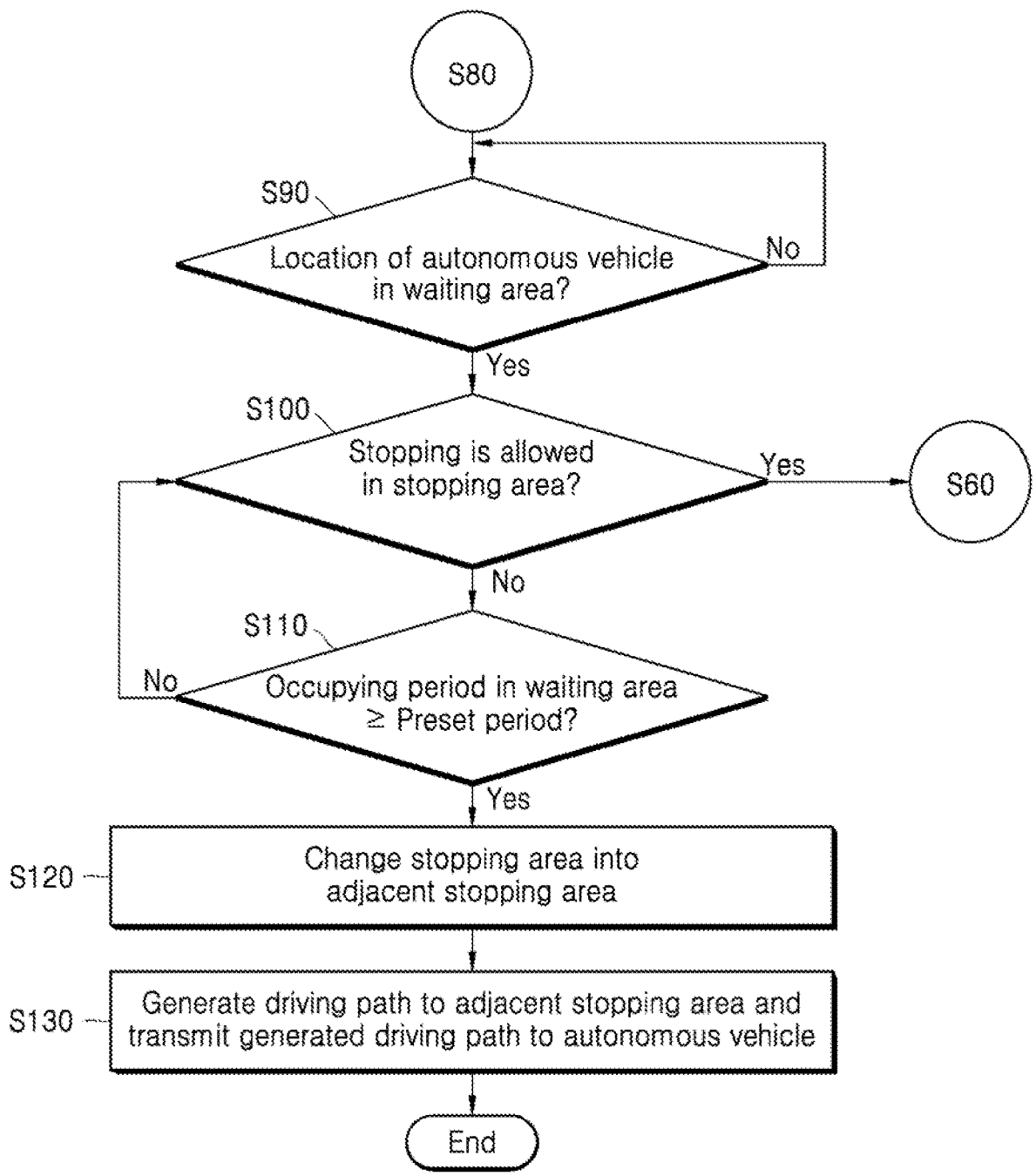

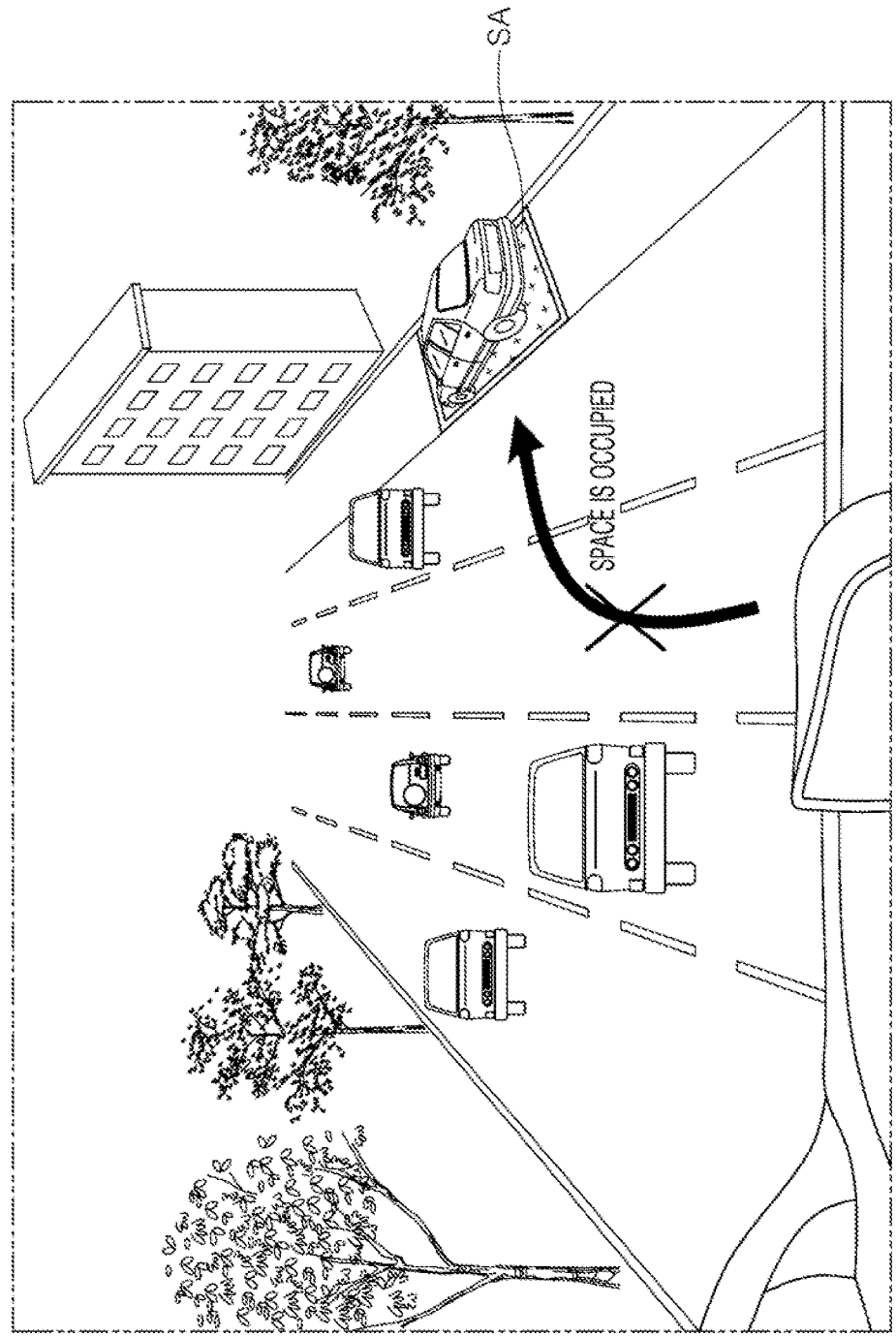

[FIG. 13a]
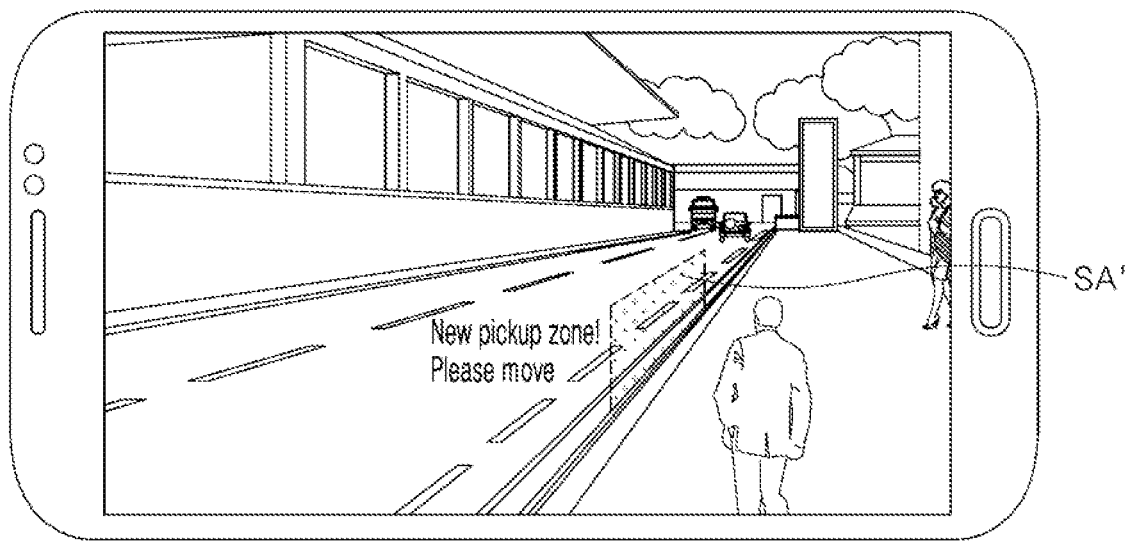

[FIG. 13b]
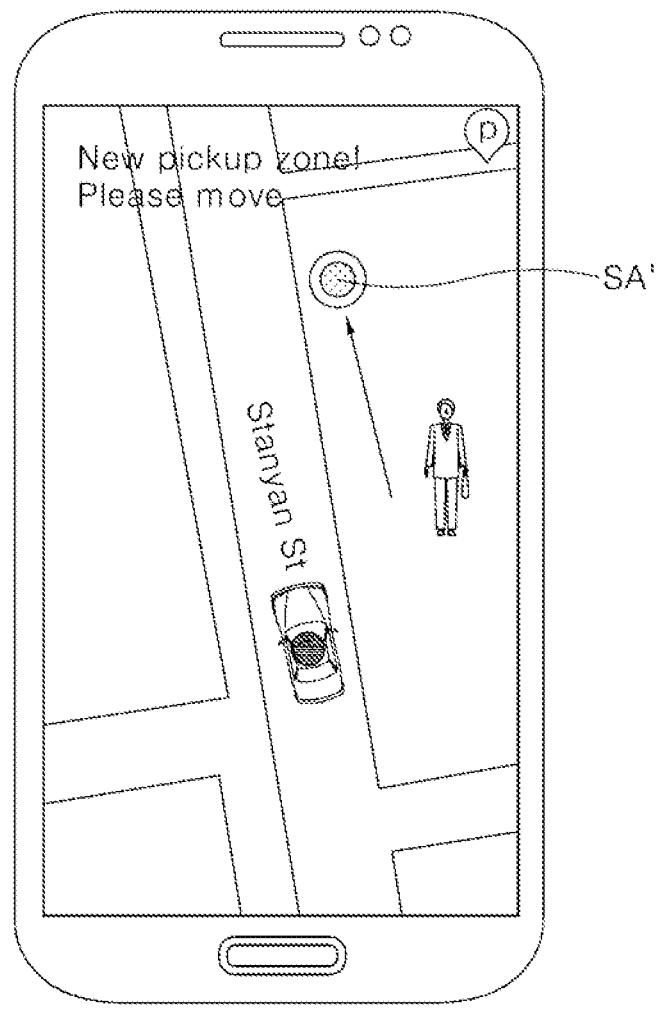

METHOD FOR PROVIDING TRANSPORTATION SERVICE USING AUTONOMOUS VEHICLE

CROSS-REFERENCE TO RELATED APPLICATIONS

This application is the National Stage filing under 35 U.S.C. 371 of International Application No. PCT/KR2019/003323, filed on Mar. 21, 2019, the contents of which are all hereby incorporated by reference herein in its entirety.

TECHNICAL FIELD

The present disclosure relates to a method for providing pickup and drop-off services to a user at designated locations using an autonomous vehicle.

BACKGROUND

In recent years, technologies for autonomous vehicles that can autonomously travel to destinations without drivers' operation have been developed, and proving various services using autonomous vehicles may be hailed as one of the industries of the future.

Currently, buses and taxies are generally used to provide transportation services. Buses travel along designated paths. Accordingly, there are times when a destination of a passenger is different from a drop-off location of a bus. This causes inconvenience to the passenger.

On the contrary, taxies pick up and drop off passengers at pickup and drop-off locations selected by the passengers. However, a driver drives a taxi for a destination selected by a passenger. Accordingly, labor costs are incurred to provide transportation services, thereby raising fees paid by passengers for transportations services.

Thus, attempts have been made to use autonomous vehicles for providing transportation services such that a passenger may select pickup and drop-off locations and fees paid for transportation services may decrease.

DISCLOSURE

Technical Problems

The objective of the present disclosure is to provide pickup and drop-off services to users at designated locations using an autonomous vehicle.

Another objective of the present disclosure is to allow an autonomous vehicle to wait in an area with a low degree of traffic congestion for a certain period when the degrees of traffic congestion of pickup and drop-off locations are high.

Another objective of the present disclosure is to determine whether pickups and drop offs are allowed on the basis of external images recorded from an autonomous vehicle.

Another objective of the present disclosure is to allow autonomous vehicles to move consecutively to pickup and drop-off locations on the basis of at least one of the location in which an autonomous vehicle, waiting to move to pickup and drop-off locations, is waiting, and the period during which an autonomous vehicle is waiting.

Another objective of the present disclosure is to allow an autonomous vehicle to move to a changed area by changing an area for pickups and drop offs when a waiting period is greater than or equal to a certain period.

Yet another objective of the present disclosure is to inform to an adjacent vehicle that an area for picking up and dropping off a user or a waiting area of an autonomous vehicle is occupied through vehicle-to-vehicle (V2V) communication.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

As a means to achieve the above-described objectives, a method for providing transportation services using an autonomous vehicle according to an embodiment includes receiving driving information from a user terminal and identifying a destination on the basis of the received driving information, generating a driving path to the destination and transmitting the generated driving path to the autonomous vehicle, identifying a stopping area corresponding to the destination when the autonomous vehicle is within a preset distance from the destination and determining whether stopping is allowed in the identified stopping area, and generating a driving path to the stopping area on the basis of results of the determination and transmitting the generated driving path to the autonomous vehicle, or setting a waiting area on the driving path to the destination, generating a driving path to the set waiting area, and transmitting the generated driving path to the autonomous vehicle.

Advantageous Effects

The present disclosure may allow a passenger to set a pickup location and a destination freely and to use services without paying labor costs incurred by using the services, thereby offering economic transportation services by providing a method for offering pickup and drop-off services to a user at designated locations using an autonomous vehicle.

Further, the present disclosure may solve the problem that an autonomous vehicle passes a destination in an area with a high degree of traffic congestion without picking up and dropping off a user, by allowing the autonomous vehicle to wait in an area with a low degree of traffic congestion for a certain period when the degrees of traffic congestion at pickup and drop-off locations are high.

Further, the present disclosure may provide pickup and drop-off services considering various external factors that may not be expected by an algorithm, by determining whether pickups and drop offs are allowed on the basis of external images recorded from an autonomous vehicle.

Further, the present disclosure may efficiently operate a plurality of autonomous vehicles in providing transportation services, by allowing autonomous vehicles to move consecutively to pickup and drop-off locations on the basis of at least one of the location in which an autonomous vehicle, waiting to move to pickup and drop-off locations, is waiting, and the period during which the autonomous vehicle is waiting.

Further, the present disclosure may reduce a waiting period spent by a user for boarding and alighting by changing an area for pickups and drop offs when the waiting period is greater than or equal to a certain period, and by allowing an autonomous vehicle to move to the changed area.

Furthermore, the present disclosure may prevent a collision between an autonomous vehicle and a regular vehicle, which can happen at pickup and drop-off locations, by informing to an adjacent vehicle that an area for picking up and dropping off a user or a waiting area of an autonomous vehicle is occupied through vehicle-to-vehicle (V2V) communication.

Specific effects of the present disclosure together with the above-described effects are described in the detailed description of embodiments.

DESCRIPTION OF THE DRAWINGS

FIG. 1 is a view illustrating a transportation-service providing system according to an embodiment.

FIG. 2 is an internal block diagram illustrating the server and the autonomous vehicle in FIG. 1.

FIG. 3 is a flow chart illustrating a method for providing transportation services according to an embodiment.

FIG. 4 is a view for explaining a process of inputting driving information through a user terminal.

FIG. 5 is a flow chart for explaining a process of determining whether stopping is allowed on the basis of the degree of traffic congestion.

FIG. 6 is a view for explaining a stopping area and a waiting area.

FIG. 7 is a view illustrating an augmented image displayed in an autonomous vehicle at the time of entering a stopping area.

FIG. 8 is a view illustrating an augmented image displayed in an autonomous vehicle at the time of entering a waiting area.

FIG. 9 is a view illustrating a plurality of waiting points included in a waiting area.

FIG. 10 is a view illustrating an augmented image displayed in an adjacent vehicle when an autonomous vehicle approaches to a stopping area.

FIG. 11 is a flow chart for explaining a process of guiding an autonomous vehicle having entered a waiting area to a stopping area.

FIG. 12 is a view for explaining a process of determining that an autonomous vehicle may not stop in a stopping area.

FIGS. 13a and 13b are views respectively illustrating augmented images and map images displayed on a user terminal when a stopping area is changed.

BEST MODE

The above-described objectives, features and advantages are specifically described with reference to the attached drawings hereunder such that one having ordinary skill in the art to which the present disclosure pertains may easily implement the technical spirit of the disclosure. In describing the disclosure, detailed description of publicly known technologies in relation to the disclosure is omitted if it is deemed to make the gist of the present disclosure unnecessarily vague. Below, preferred embodiments of the present disclosure are specifically described with reference to the attached drawings. Throughout the drawings, identical reference numerals denote identical or similar elements.

The present disclosure relates to a method for providing pickup and drop-off services to a user at designated locations using an autonomous vehicle.

Specifically, a below-described present disclosure relates to a method for providing pickup and drop-off services to a user at designated locations using an autonomous vehicle, which may allow a passenger to set a pickup location and a destination freely and to use services without paying labor costs incurred by using the services, thereby offering economic transportation services.

Below, a transportation-service providing system according to an embodiment, and a method for providing transportation services using an autonomous vehicle by the system are specifically described with reference to FIGS. 1 to 13.

FIG. 1 is a view illustrating a transportation-service providing system according to an embodiment, and FIG. 2 is an internal block diagram illustrating the server and the autonomous vehicle in FIG. 1.

FIG. 3 is a flow chart illustrating a method for providing transportation services according to an embodiment, and FIG. 4 is a view for explaining a process of inputting driving information through a user terminal.

FIG. 5 is a flow chart for explaining a process of determining whether stopping is allowed on the basis of the degree of traffic congestion, and FIG. 6 is a view for explaining a stopping area and a waiting area.

FIG. 7 is a view illustrating an augmented image displayed in an autonomous vehicle at the time of entering a stopping area, and FIG. 8 is a view illustrating an augmented image displayed in an autonomous vehicle at the time of entering a waiting area.

FIG. 9 is a view illustrating a plurality of waiting points included in a waiting area.

FIG. 10 is a view illustrating an augmented image displayed in an adjacent vehicle when an autonomous vehicle approaches to a stopping area.

FIG. 11 is a flow chart for explaining a process of guiding an autonomous vehicle having entered a waiting area to a stopping area, and 12 is a view for explaining a process of determining that an autonomous vehicle may not stop in a stopping area.

FIGS. 13a and 13b are views respectively illustrating augmented images and map images displayed on a user terminal when a stopping area is changed.

Transportation services described in the present disclosure may include pickup and drop-off services. Accordingly, the transportation services may include pickup services for would-be passengers and drop-off services for passengers.

Referring to FIG. 1, a transportation-service providing system 1 according to an embodiment may include a server 100, an autonomous vehicle 200, and a user terminal 300. The transportation-service providing system 1 illustrated in FIG. 1 is based on an embodiment, and elements thereof are not limited to the embodiment illustrated in FIG. 1. When necessary, some elements may be added, modified or removed.

Objects provided with transportation services may be mixedly referred to as would-be passengers, passengers, users and the like for convenience of description, hereunder.

The server 100, the autonomous vehicle 200, and the user terminal 300, which constitute the transportation-service providing system 1, may connect to a wireless network and may perform data communication with one another. In the present disclosure, the user terminal 300, as a terminal of a user using transportation services, may be defined as a terminal of a would-be passenger or a passenger.

The autonomous vehicle 200 may denote a vehicle that drives itself to a destination without a driver's operation. The autonomous vehicle 200 may include any transportation means such as automobiles, motorcycles and the like, but below, denotes automobiles for convenience of description.

The autonomous vehicle 200 may be managed by a transportation company, and a user may board the autonomous vehicle 200 in a below-described process of providing transportation services.

A plurality of human machine interfaces (HMI) may be provided in the autonomous vehicle 200. Basically, the HMI may perform the function that outputs information on a vehicle or on the state of a vehicle to a driver through a plurality of physical interfaces visually and acoustically. Additionally, in the process of providing transportation services, the HMI may receive an input of various types of user manipulation to provide transportation services or may output details about services to a user.

The server 100 may be built on the basis of a cloud, and may store and manage information collected from the autonomous vehicle 200 and the user terminal 300 that connect to a wireless network. The server 100 may be managed by a transportation company operating autonomous vehicles 200, and may control the autonomous vehicles 200 using wireless data communication.

Referring to FIG. 2, the server 100 according to an embodiment may include a path generating module 110, a stop managing module 120, a database 130 and a first communication module 140. The autonomous vehicle 200 may include a display module 210, an autonomous driving module 220, a GPS module 230, a camera module 240 and a second communication module 250.

The internal configurations of the server 100 and autonomous vehicle 200 illustrated in FIG. 2 are provided only as examples, and elements thereof are not limited to the examples in FIG. 2. When necessary, some elements may be added, modified or removed.

The modules in the server 100 and autonomous vehicle 200 may be implemented as at least one physical element among application specific integrated circuits (ASICs), digital signal processors (DSPs), digital signal processing devices (DSPDs), programmable logic devices (PLDs), field programmable gate arrays (FPGAs), processors, controllers, micro-controllers, and microprocessors.

Referring to FIG. 3, a method for providing transportation services using an autonomous vehicle 200 (hereinafter referred to as method for providing transportation services) according to an embodiment includes identifying a destination on the basis of driving information received from a user terminal 300 (S10), generating a driving path to the destination and transmitting the generated driving path to an autonomous vehicle 200 (S20), and determining whether the location of the autonomous vehicle 200 is within a preset distance from the destination (S30).

Additionally, the method for providing transportation services may include identifying a stopping area (SA) corresponding to a destination when the location of the autonomous vehicle 200 is within a preset distance from the destination (S40), and determining whether stopping is allowed in the stopping area (SA) (S50).

Additionally, the method for providing transportation services may include when stopping is allowed in the stopping area (SA), generating a driving path to the stopping area (SA) and transmitting the generated driving path to the autonomous vehicle 200 (S60), and when stopping is not allowed in the stopping area (SA), setting a waiting area (WA), generating a driving path to the waiting area (WA), and transmitting the generated driving path to the autonomous vehicle 200 (S80).

The method for providing transportation services may be performed by the above-described server 100, and the server 100 may perform data communication with the autonomous vehicle 200 and the user terminal 300 to carry out the operation of each of the steps in FIG. 3.

Below, each of the steps in a method for providing transportation services is specifically described with reference to the drawings.

A path generating module 110 in a server 100 may receive driving information from a user terminal 300 and may identify a destination on the basis of the received driving information (S10).

Specifically, a first communication module 140 in the server 100 may receive driving information by performing wireless data communication with the user terminal 300. To this end, a user may input driving information through the user terminal 300.

Applications in relation to transportation services (hereinafter referred to as transportation application) may be previously installed in the user terminal 300. The transportation applications may provide an interface for inputting driving information, and the user may input driving information through the interface.

The driving information may include information on a destination of the autonomous vehicle 200 being driven, and specifically, may include at least one of a pickup location (pickup zone) and a drop-off location (drop-off zone). For example, when a would-be passenger calls the autonomous vehicle 200, the driving information may include a pickup location requested by the would-be passenger. Additionally, when a passenger alights from the autonomous vehicle 200, the driving information may include a drop-off location requested by the passenger.

A process of inputting a pickup location by a user is described with reference to FIG. 4. A transportation application may provide an address window through the screen of the user terminal 300, and the user may input the address (31, Los Angeles Airport Terminal 1) of a requested pickup location to the address window. In this case, the path generating module 110 may receive the address 31 of the pickup location requested by the user as a pickup location.

Additionally, the transportation application may provide a map 32 through the screen of the user terminal 300, and the user may touch a requested pickup location 33 on the map 32. In this case, the path generating module 110 may receive the location 33 touched by the user as a pickup location.

The method for inputting a pickup location described with reference to FIG. 4 may also be applied to inputting a drop-off location by a user. The method for inputting a pickup location and a drop-off location is not limited to the method described in FIG. 4. Accordingly, any method for specifying an address or a geographical location may be used.

The path generating module 110 may identify at lease one of the pickup location and drop-off location, included in the driving information, as a destination.

Specifically, the path generating module 110 may identify a pickup location, included in the driving information, as a destination, to provide pickup services for a would-be passenger. Additionally, the path generating module 110 may identify a drop-off location, included in the driving information, as a destination, to provide drop-off services for a passenger. When a pickup location and a drop-off location are all received from the user terminal 300 of a would-be passenger, the path generating module 110 may identify all the pickup and drop-off locations as consecutive destinations of the autonomous vehicle 200.

Next, the path generating module 110 may generate a driving path to the destinations and may transmit the generated driving path to the autonomous vehicle 200 (S20).

Specifically, the path generating module 110 may identify the current location of the autonomous vehicle 200 through the global positioning system (GPS) module of the autonomous vehicle 200 and may generate a driving path from the identified current location to a destination.

The path generating module 110 may generate a driving path on the basis of traffic condition information. To this end, the path generating module 110 and a traffic information server 400 may connect to a network and may receive information on current traffic conditions from the traffic information server 400. The traffic information server 400, as a server that manages information on traffic in real time such as information on roads, traffic congestion, road surface condition and the like, may be a server managed nationally or privately.

Any methods employed in the art to which the present disclosure pertains may be applied to a method generating a driving path by reflecting traffic condition information. Accordingly, detailed description is omitted.

The driving path may be implemented as a map including path guiding information, and specifically, may be implemented as a high definition (HD) map including a three-dimensional topography data.

The path generating module 110 may transmit the generated driving path to an autonomous driving module 220 in the autonomous vehicle 200 through the first communication module 140. The autonomous driving module 220 may receive the driving path through a second communication module 250 and may control driving of the autonomous vehicle 200 on the basis of the received driving path.

Algorithms for maintaining a distance between vehicles, preventing the autonomous vehicle 200 from escaping from the lane, tracking the lane, detecting signals, detecting a pedestrian, detecting a structure, sensing traffic conditions, autonomous parking and the like may be applied to control exerted by the autonomous driving module 220 over the autonomous vehicle 200. In addition to the above-described algorithms, various algorithms employed in the art to which the disclosure pertains may be applied to autonomous driving.

The autonomous vehicle 200 may travel to a destination along the driving path on the basis of the control by the autonomous driving module 220 without additional user manipulation.

The stop managing module 120 may determine whether the autonomous vehicle 200 is within a preset distance apart from the destination (S30).

The autonomous vehicle 200 may move to the destination along the above-described driving path. A distance between the autonomous vehicle 200 being driven and the destination may become shorter. The stop managing module 120 may identify the location of the autonomous vehicle 200, and may determine whether the autonomous vehicle 200 is within a preset distance by comparing the identified location and the location of the destination.

Specifically, the stop managing module 120 may identify the location of the autonomous vehicle 200 by receiving location information from the GPS module 230 in the autonomous vehicle 200, and may determine whether the autonomous vehicle 200 is within the preset distance from the destination by comparing the identified location and the location of the destination.

The GPS module 230 in the autonomous vehicle 200 may receive signals transmitted from a satellite and may generate location information of the autonomous vehicle 200. The GPS module 230 may transmit the generated location information to the server 100 through the second communication module 250.

The stop managing module 120 may identify the current location of the autonomous vehicle 200 by receiving location information of the autonomous vehicle 200 through the first communication module 140, and may calculate a distance between the identified location and the destination.

When the calculated distance exceeds the preset distance, the stop managing module 120 may continuously identify the current location of the autonomous vehicle 200. When the calculated distance is within the preset distance, the stop managing module 120 may identify a stopping area (SA) corresponding to the destination (S40). That is, the stop managing module 120 may identify the stopping area (SA) at the point in time when the autonomous vehicle 200 approaches to the destination.

The stopping area (SA), as an area in which the autonomous vehicle 200 stops temporarily such that a user may board or alight from the autonomous vehicle 200, may be set as an area in which a vehicle may stop systematically.

A stopping area (SA) corresponding to a destination may be previously stored in the database 130 in the server 100. Referring to FIG. 4, when Los Angeles Airport Terminal 1 is set as a destination, the parking lot of Airport Terminal 1 (e.g., A in FIG. 4) may be previously set as a stopping area (SA) corresponding to the destination and may be stored in the database 130. The stop managing module 120 may identify the parking lot of Airport Terminal 1 as a stopping area (SA) with reference to the database 130.

When the stopping area (SA) is identified, the stop managing module 120 may determine whether the autonomous vehicle 200 may stop in the stopping area (SA) (S50).

As an example, the stop managing module 120 may determine whether stopping is allowed in the stopping area (SA) on the basis of traffic information. Specifically, the stop managing module 120 may determine whether stopping is allowed in the stopping area (SA) on the basis of the degree of traffic congestion in the stopping area (SA).

The degree of traffic congestion in the stopping area (SA), as a parameter provided by the above-described traffic information server 400, may be any parameter quantitatively expressed on the basis of the state in which the road in a certain zone including the stopping area (SA) is occupied by vehicles. For example, when a road near the stopping area (SA) is occupied by a large number of vehicles, the degree of traffic congestion may increase, and when a road near the stopping area (SA) is occupied by a small number of vehicles, the degree of traffic congestion may decrease.

Referring to FIG. 5, the stop managing module 120 may identify the degree of traffic congestion in the stopping area (SA) by performing data communication with the traffic information server 400 (S51). When the degree of traffic congestion is identified, the stop managing module 120 may compare the degree of traffic congestion with a preset reference value (S52). The reference value may be determined statistically as a parameter for determining whether stopping is allowed.

The stop managing module 120 may determine that the stopping area (SA) is in a stopping state in which the autonomous vehicle 200 may stop or may determine that the stopping area (SA) is in a non-stopping state in which the autonomous vehicle 200 may not stop, by comparing the degree of traffic congestion in the stopping area (SA) and the reference value.

The stop managing module 120 may determine that the stopping area (SA) is in the non-stopping state when the degree of traffic congestion is greater than or equal to the reference value (S53), and may determine that the stopping area (SA) is in the stopping state when the degree of traffic congestion is less than the reference value (S54).

Referring to FIG. 6, a stopping area (SA) set on a driving path to a destination may be included in zone A. The degree of traffic congestion in zone A may be greater than or equal to the reference value because zone A is occupied by a large number of vehicles. In this case, the stop managing module 120 may determine that the stopping area (SA) is in the non-stopping state.

Unlike the degree of traffic congestion in FIG. 6, the degree of traffic congestion in zone A may be less than the reference value when zone A is occupied by a small number of vehicles. In this case, the stop managing module 120 may determine that the stopping area (SA) is in the stopping state.

The path generating module 110 may generate a driving path to the stopping area (SA) on the basis of results of the above-described determination and may transmit the generated driving path to the autonomous vehicle 200 (S60), or may set a waiting area (WA) on a driving path to a destination (S70), may generate a driving path to the set waiting area (WA), and may transmit the generated driving path to the autonomous vehicle 200 (S80).

Specifically, when the stopping area (SA) is in the stopping state, the path generating module 110 may generate a driving path to the stopping area (SA) and may transmit the generated driving path to the autonomous vehicle 200. A method for generating a driving path to the stopping area (SA) is the same as the method described in step 30 of FIG. 3. Accordingly, detailed description is omitted.

The autonomous driving module 220 may allow the autonomous vehicle 200 to move to the stopping area (SA) along the driving path to the stopping area (SA), and may allow the autonomous vehicle 200 to park in the stopping area (SA) using an algorithm for autonomous parking.

An augmented reality engine may be mounted onto the display module 210 in the autonomous vehicle 200. Accordingly, the display module 210 may output augmented images for guiding the autonomous vehicle 200 to the stopping area (SA) through the front glass of the autonomous vehicle 200.

Referring to FIG. 7, as the autonomous vehicle 200 has moved to the stopping area (SA), augmented images displaying the stopping area (SA) and augmented images indicating a direction for the stopping area (SA) may be displayed on the front glass of the autonomous vehicle 200. A passenger may easily find out an expected path for driving of the autonomous vehicle 200 and a drop-off location of the passenger through the augmented images.

Through the above-described process, when a would-be passenger calls the autonomous vehicle 200 to a destination, the would-be passenger may board the autonomous vehicle 200 parked in a stopping area (SA) corresponding to the destination. Additionally, as a passenger aboard the autonomous vehicle 200 has moved to a destination, the passenger may alight from the autonomous vehicle 200 parked in a stopping area (SA) corresponding to the destination.

When the stopping area (SA) is in the non-stopping state, the stop managing module 120 may set a waiting area (WA) on a driving path to a destination, and the path generating module 110 may generate a driving path to the waiting area (WA) and may transmit the generated driving path to the autonomous vehicle 200.

The waiting area (WA) may be defined as an area in which the autonomous vehicle 200 is temporarily waiting to enter the stopping area (SA) that is currently in the non-stopping state.

The stop managing module 120 may set an area located a certain distance apart from the stopping area (SA) as any waiting area (WA) in which the autonomous vehicle 200 may stop on a driving path to a destination.

To this end, the stop managing module 120 may set an area with the degree of traffic congestion less than the reference value on a driving path to a destination as a waiting area (WA).

Referring back to FIG. 6, when the degree of traffic congestion of zone A including the stopping area (SA) is high, the stopping area (SA) may be in the non-stopping state. In this case, the stop managing module 120 may set any area, in which stopping is allowed, in zone B with the degree of traffic congestion less than the reference value as a waiting area (WA) on a driving path to a destination.

When the waiting area (WA) is set, the path generating module 110 may generate a driving path to the waiting area (WA) and may transmit the generated driving path to the autonomous vehicle 200. A method for generating a driving path to the waiting area (WA) is the same as the method described in step 30 of FIG. 3. Accordingly, detailed description is omitted.

The autonomous driving module 220 may allow the autonomous vehicle 200 to move to the waiting area (WA) along the driving path to the waiting area (WA), and may park the autonomous vehicle 200 in the waiting area (WA) using an algorithm for autonomous parking.

As described above, when the degree of traffic congestion at a pickup location and a drop-off location is high, the present disclosure may allow the autonomous vehicle 200 to wait in an area with a low degree of traffic congestion for a certain period. Accordingly, the present disclosure may solve the problem that a vehicle passes a destination in an area with a high degree of traffic congestion without picking up and dropping off a user.

The display module 210 in the autonomous vehicle 200 may output augmented images for guiding the autonomous vehicle 200 to a waiting area (WA) through the front glass of the autonomous vehicle 200.

Referring to FIG. 8, as the autonomous vehicle 200 has moved to a waiting area (WA), augmented images displaying the stopping area (SA) and the waiting area (WA), and augmented images indicating a direction for the waiting area (WA) may be displayed on the front glass of the autonomous vehicle 200. A passenger may easily find out an expected path for driving of the autonomous vehicle 200, a location in which the autonomous vehicle 200 is waiting, and a location from which the passenger alights through the augmented images.

The waiting area (WA) may include a plurality of waiting points (wp) that are consecutively arranged along a driving path to a destination. In this case, the server 100 may identify non-occupied waiting points that are not occupied among the plurality of waiting points (wp), may generate a driving path to any one non-occupied waiting point closest to the destination among the identified non-occupied waiting points, and may transmit the generated driving path to the autonomous vehicle 200.

An occupied waiting point may be defined as a waiting point that is currently occupied or is expected to be occupied, and a non-occupied waiting point may be defined as a waiting point that is not currently occupied and is expected not to be occupied.

Referring to FIG. 9, a waiting area (WA) may include a plurality of waiting points (wp1 to wp6) that are arranged in line along a driving path to a destination at the side of the road. The server 100 may generate a driving path to any one waiting point among the plurality of waiting points (wp1 to wp6) and may transmit the generated driving path to the autonomous vehicle 200. Accordingly, information on which one of the waiting points is an occupied waiting point may be stored in the database 130 in the server 100.

For example, when waiting points 2, 3 and 5 (wp2, wp3, and wp5) are occupied waiting points among the plurality of waiting points (wp1 to wp6) as illustrated in FIG. 9, the stop managing module 120 may identify waiting points 1, 4, and 6 (wp1, wp4, and wp6) as non-occupied waiting points among the plurality of waiting points (wp1 to wp6). The path generating module 110 may generate a driving path to waiting point 1 (wp1) closest to a destination among the non-occupied waiting points (wp1, wp4, and wp6), and may transmit the generated driving path to the autonomous vehicle 200.

After waiting point 1 (wp1) is occupied, the path generating module 110 may generate a driving path to waiting point 4 (wp4) closest to the destination among the non-occupied waiting points (wp4 and wp6), and may transmit the generated driving path to the autonomous vehicle 200.

According to the process, the autonomous vehicles 200 may occupy a waiting point closest to a destination in the order in which the autonomous vehicles 200 enter a waiting area (WA).

The autonomous vehicle 200, which is moving autonomously along the driving path to the stopping area (SA) or the waiting area (WA), may transmit an occupancy prediction signal for the stopping area (SA) or the waiting area (WA) to an adjacent vehicle through vehicle-to-vehicle (V2V) communication.

Specifically, the second communication module 250 in the autonomous vehicle 200 may use any V2V communication protocol. Accordingly, the autonomous vehicle 200, which is moving to the stopping area (SA) or the waiting area (WA), may transmit an occupancy prediction signal for the stopping area (SA) or the waiting area (WA) to an adjacent autonomous vehicle 200 or a regular vehicle (e.g., vehicles using no self-driving technology) that uses a V2V communication protocol.

The occupancy prediction signal may be a signal indicating that entry into the stopping area (SA) or the waiting area (WA) is expected such that adjacent vehicles may not enter the stopping area (SA) or the waiting area (WA). A vehicle, which receives the occupancy prediction signal, may output a warning against the entry into a specific stopping area (SA) or waiting area (WA) visually or acoustically.

Referring to FIG. 10, the autonomous vehicle 200 may transmit an occupancy prediction signal to an adjacent vehicle equipped with an augmented reality engine. The vehicle having received the occupancy prediction signal may output an augmented image indicating that a specific autonomous vehicle 200 is expected to occupy the stopping area (SA), through the front glass of the vehicle.

As described above, the present disclosure may prevent a collision between an autonomous vehicle 200 and a regular vehicle, which can happen at pickup and drop-off locations, by informing to an adjacent vehicle that an area for picking up and dropping off a user, or a waiting area of an autonomous vehicle 200 is expected to be occupied through V2V communication.

Operations that are performed by the server 100 and the autonomous vehicle 200 after the autonomous vehicle 200 enters a waiting area (WA) are described hereunder with reference to FIG. 11.

The stop managing module 120 may receive external image information from a camera module 240 in the autonomous vehicle 200, and on the basis of the received external image information, may determine whether stopping is allowed in the stopping area (SA).

To describe a method for determining whether stopping is allowed on the basis of external image information, an autonomous vehicle 200, moving to a destination along a driving path, is defined as a first autonomous vehicle 200, and an autonomous vehicle 200, moving to a destination different from the destination of the first autonomous vehicle 200, and passing or located near the destination of the first autonomous vehicle 200, is defined as a second autonomous vehicle 200.

That is, there may be a plurality of autonomous vehicles 200 managed by the server 100. An autonomous vehicle 200, moving to a destination according to the above-described method among the autonomous vehicles 200, may be defined as a first autonomous vehicle 200, and an autonomous vehicle 200, passing the destination or located near the destination among the rest autonomous vehicles 200, may be defined as a second autonomous vehicle 200.

As illustrated in FIG. 2, all the autonomous vehicles 200 managed by the server 100 may include a camera module 240. The camera module 240 may record images outside the autonomous vehicle 200 and may transmit the recorded images to the server 100.

According to step 20 in FIG. 3, the path generating module 110 may generate a driving path to the destination and may transmit the generated driving path to the first autonomous vehicle 200, and the first autonomous vehicle 200 may move to the destination.

The camera module 240 of the first autonomous vehicle 200 moving to the destination may record external images, and in the recorded external images, a stopping area (SA) corresponding to the destination may be recorded. Additionally, the camera module 240 of the second autonomous vehicle 200 may also record external images, and in the external images recorded by the camera module 240 of the second autonomous vehicle 200, the stopping area (SA) corresponding to the destination of the first autonomous vehicle 200 may be recorded.

Information on the external images recorded by the camera modules 240 of the first and second autonomous vehicles 200 may be transmitted to the server 100, and the server 100 may determine whether stopping is allowed in the stopping area (SA) on the basis of the external image information.

Specifically, in images of the stopping area (SA) identified through the external image information, when the stopping area (SA) is not occupied by any vehicle, the stop managing module 120 may determine that the stopping area (SA) is in the stopping state. On the contrary, in images of the stopping area (SA) identified through the external image information, when the stopping area (SA) is occupied by any vehicle, the stop managing module 120 may determine that the stopping area (SA) is in the non-stopping state.

Operations performed by the server 100 on the basis of whether stopping is allowed in the stopping area (SA) are described above with reference to step 60 and step 70 in FIG. 3. Accordingly, any detailed description is omitted.

Even when the stopping area (SA) is determined to be in the non-stopping state in the order illustrated in FIG. 5, the server 100 may receive external image information, and may determine that the stopping area (SA) is in the stopping state on the basis of the received external image information.

Referring to FIG. 6, when the degree of traffic congestion in zone A is greater than or equal to a reference value, the stopping area (SA) may be in the non-stopping state. In this case, the server 100 may confirm that the stopping area (SA)

included in zone A is not occupied by any vehicle through external image information received from the second autonomous vehicle 200 passing the destination. Then the server 100 may determine that the stopping area (SA) is in the stopping state again.

In other words, when a large number of vehicles occupy zone A but no vehicle occupies the stopping area (SA) included in zone A, the server 100 may determine that the stopping area (SA) in the non-stopping state is in the stopping state again. When the stopping area (SA) is determined to be in the stopping state, the server 100 may perform the operation in step 60 of FIG. 2, and the autonomous vehicle 200 may be parked in the stopping area (SA).

As described above, the present disclosure may provide pickup and drop-off services considering various external factors that may not be expected by an algorithm, by determining whether a pickup and a drop off are allowed on the basis of external images recorded from the autonomous vehicle 200.

Below, operations of the server 100 and the autonomous vehicle 200 when the autonomous vehicle 200 moves to a waiting area (WA) are described with reference to the flow chart in FIG. 11.

Referring to FIG. 11, the stop managing module 120 may determine whether the location of the autonomous vehicle 200 is in the waiting area (WA) (S90). Specifically, the stop managing module 120 may continuously determine whether the current location of the autonomous vehicle 200 is in the waiting area (WA) on the basis of location information received from the GPS module 230 of the autonomous vehicle 200.

When the location of the autonomous vehicle 200 is in the waiting area (WA) as a result of determination, the stop managing module 120 may determine whether stopping is allowed in the stopping area (SA) (S100). Operations in step 100 may be continuously performed on the basis of a preset cycle.

When the stopping area (SA) is in the stopping state as a result of determination, the server 100 may operate according to step 60 in FIG. 3, and the autonomous vehicle 200 may move to the stopping area (SA) along a driving path to the stopping area (SA).

In performing the operations in step 60, the server 100 may transmit a driving path to the stopping area (SA) to an autonomous vehicle 200 that enters the waiting area (WA) at the earliest point in time among the plurality of autonomous vehicles 200 located in the waiting area (WA).

Specifically, there may be a plurality of autonomous vehicles 200 that will enter a stopping area (SA) in the non-stopping state. In this case, the plurality of autonomous vehicles 200 may enter the same waiting area (WA) and may wait. However, a point in time when each of the autonomous vehicles 200 enters the waiting area (WA) may vary.

The stop managing module 120 may store the point in time when each of the autonomous vehicles 200 enters the waiting area (WA) in the database 130 on the basis of the location information received from the GPS module 230 of each of the autonomous vehicles 200. Then when the stopping area (SA) is in the stopping state, the stop managing module 120 may transmit a driving path to the stopping area (SA) to an autonomous vehicle 200 that enters the waiting area (WA) at the earliest point in time with reference to the database 130.

In other words, the stop managing module 120 may transmit a driving path to the stopping area (SA) first to an autonomous vehicle 200 that is waiting in the waiting area (WA) for the longest period.

Additionally, the server 100 may also transmit a driving path to the stopping area (SA) to an autonomous vehicle 200 occupying a waiting point (wp) closest to a destination among the plurality of autonomous vehicles 200 respectively occupying a plurality of waiting points (wp).

Referring back to FIG. 9, waiting points 2, 3 and 5 (wp2, wp3, and wp5) may be occupied respectively by the autonomous vehicles 200. In this case, the stopping area (SA) may be determined to be in the stopping state through step 100 in FIG. 11.

In this case, the path generating module 110 may generate a driving path to the stopping area (SA) and may transmit the generated driving path to an autonomous vehicle 200 occupying waiting point 2 (wp2) closest to a destination.

In other words, the path generating module 110 may transmit the driving path to the stopping area (SA) first to an autonomous vehicle 200 located in a waiting point closest to a destination in the waiting area (WA).

As described above, the present disclosure may efficiently operate a plurality of autonomous vehicles 200 in providing transportation services by allowing autonomous vehicles to move consecutively to pickup and drop-off locations on the basis of at least one of the location in which an autonomous vehicle 200, waiting to move to pickup and drop-off locations, is waiting, and the period during which an autonomous vehicle is waiting.

When the stopping area (SA) is determined to be in the non-stopping state, in step 100 of FIG. 11, the stop managing module 120 may determine whether the location of an autonomous vehicle 200 is in the waiting area (WA) for a preset period or more (S110). When an occupying period in the waiting area (WA) is less than a preset period as a result of determination, the stop managing module 120 may continuously determine whether the stopping area (SA) is in the stopping state (S100).

On the contrary, when an occupying period in the waiting area (WA) is greater than or equal to a preset period as a result of determination, the stop managing module 120 may change the stopping area (SA) into an adjacent stopping area (SA') (S120), may generate a driving path to the adjacent stopping area (SA), and may transmit the generated driving path to the autonomous vehicle 200 (S130).

The stop managing module 120, as described above, may store the point in time when each of the autonomous vehicles 200 enters the waiting area (WA) in the database 130, and may count an occupying period, i.e., a period from the point in time when each of the autonomous vehicles 200 enters the waiting area (WA) to the current point in time.

When the counted occupying period is greater than or equal to a preset period, the stop managing module 120 may change a preset stopping area (SA) into an adjacent stopping area (SA'). The adjacent stopping area (SA') may be defined as another stopping area (SA) that is within a preset distance from the stopping area (SA).

Specifically, when there are a plurality of stopping areas (SA) corresponding to any one destination, an adjacent stopping area (SA') may be another stopping area (SA) except a preset stopping area (SA) among the plurality of stopping areas (SA) corresponding to the destination. Additionally, when there is a single stopping area (SA) corresponding to any one destination, an adjacent stopping area (SA') may be a stopping area (SA) corresponding to another destination adjacent to the destination.

The adjacent stopping area (SA') may be set as a stopping area (SA) determined to be in the stopping state except a preset stopping area (SA). That is, the stop managing module 120 may change a stopping area (SA) currently in the non-stopping state into an adjacent stopping area (SA') in the stopping state.

When the stopping area (SA) is changed into an adjacent stopping area (SA'), the path generating module 110 may generate a driving path to the adjacent stopping area (SA') and may transmit the generated driving path to the autonomous vehicle 200, and the autonomous vehicle 200 may move to the adjacent stopping area (SA'). Operations of the autonomous vehicle 200 after the autonomous vehicle 200 moves to the adjacent stopping area (SA') may be the same as operations of the autonomous vehicle 200 after the autonomous vehicle 200 moves to the stopping area (SA).

As described above, the present disclosure may reduce a waiting period spent by a user for boarding and alighting by changing an area for pickups and drop offs when a waiting period is greater than or equal to a certain period, and by allowing an autonomous vehicle 200 to move to the changed area.

When non-stopping signals are received from an autonomous vehicle 200, the stop managing module 120 may change a stopping area (SA) into an adjacent stopping area (SA'). The non-stopping signals, as a signal generated from inside the autonomous vehicle 200, may be signals indicating that stopping is not allowed in the stopping area (SA) due to arbitrary factors.

As the autonomous vehicle 200 has moved to the stopping area (SA), the camera module 240 may record images of the stopping area (SA). The autonomous driving module 220 may identify the stopping area (SA) occupied by regular vehicles, structures, people and the like on the basis of the images recorded by the camera module 240. Additionally, the autonomous driving module 220 may identify flooded roads, uneven roads, and the like in the stopping area (SA) on the basis of the images recorded by the camera module 240.

Referring to FIG. 12, as the autonomous vehicle 200 has moved to a stopping area (SA) because the stopping area (SA) is in the stopping state, the stopping area (SA) may be already occupied by a regular vehicle. In this case, the autonomous driving module 220 may identify the stopping area (SA) being occupied, on the basis of images recorded by the camera module 240.

Then the display module 210 may output augmented images for indicating that stopping is not allowed in the stopping area (SA) through the front glass of the autonomous vehicle 200. For example, as illustrated in FIG. 12, augmented images indicating the stopping area (SA) is occupied, and augmented images indicating entry into the stopping area (SA) is not allowed are displayed in the display module 210. A passenger may easily find out that stopping is not allowed at the drop-off location that is currently set, through the augmented images.

When the stopping area (SA) is in the non-stopping state due to arbitrary factors as described above, the autonomous driving module 220 may generate non-stopping signals and may transmit the generated non-stopping signals to the server 100. The stop managing module 120 in the server 100 may receive the non-stopping signals, may respond to the non-stopping signals, and may change the stopping area (SA) into an adjacent stopping area (SA').

When the stopping area (SA) is changed into an adjacent stopping area (SA') according to the above-described method, the server 100 may transmit information on the adjacent stopping area (SA') to the user terminal 300. The information on the adjacent stopping area (SA') may include location information, and the location information may be expressed as augmented images, maps and the like on the user terminal 300.

Referring to FIG. 13*a*, the transportation application installed on the user terminal 300 may express location information on the adjacent stopping area (SA') received from the server 100 as augmented images in external images recorded from the user terminal 300. Additionally, referring to FIG. 13*b*, the transportation application may express location information on the adjacent stopping area (SA') received from the server 100 in maps displayed on the user terminal 300.

The present disclosure may be replaced, modified and changed in different forms by one having ordinary skill in the art to which the disclosure pertains within the technical spirit of the disclosure. Thus, the present disclosure should not be construed as being limited to the embodiments and drawings set forth herein.

The invention claimed is:

1. A method for providing transportation services using an autonomous vehicle, comprising:
   receiving driving information from a user terminal, and identifying a destination based on the received driving information;
   generating a driving path to the destination and transmitting the generated driving path to the autonomous vehicle;
   identifying a stopping area corresponding to the destination when the autonomous vehicle is within a preset distance from the destination, and determining whether stopping is allowed in the identified stopping area; and
   generating a driving path to the stopping area based on results of the determination and transmitting the generated driving path to the autonomous vehicle, or setting a waiting area on the driving path to the destination, generating a driving path to the set waiting area, and transmitting the generated driving path to the autonomous vehicle,
   wherein the waiting area includes a plurality of waiting points that are consecutively arranged along the driving path to the destination, and
   wherein generating the driving path to the stopping area and transmitting the generated driving path to the autonomous vehicle comprise transmitting the driving path to the stopping area to an autonomous vehicle occupying a waiting point closest to the destination among a plurality of autonomous vehicles respectively occupying the plurality of waiting points.

2. The method of claim 1, wherein receiving the driving information from the user terminal and identifying the destination based on the received driving information comprise identifying at least one of a pickup location or a drop-off location included in the driving information as the destination.

3. The method of claim 1, wherein the method further comprises identifying a location of the autonomous vehicle by receiving location information from a GPS (global positioning system) module in the autonomous vehicle and determining whether the autonomous vehicle is within a preset distance from the destination by comparing the identified location and a location of the destination.

4. The method of claim 1, wherein determining whether stopping is allowed in the identified stopping area comprises determining whether stopping is allowed in the stopping area based on a degree of traffic congestion in the stopping area.

5. The method of claim 4, wherein determining whether stopping is allowed in the stopping area based on the degree of traffic congestion in the stopping area comprises determining that the stopping area is in a non-stopping state when the degree of traffic congestion is greater than or equal to a reference value, and determining that the stopping area is in a stopping state when the degree of traffic congestion is less than the reference value.

6. The method of claim 4, wherein the method further comprises identifying the degree of traffic congestion in the stopping area by performing data communication with a traffic information server.

7. The method of claim 1, wherein determining whether stopping is allowed in the identified stopping area comprises receiving external image information from a camera module in the autonomous vehicle and determining whether stopping is allowed in the stopping area based on the received external image information.

8. The method of claim 1, wherein setting the waiting area on the driving path to the destination comprises setting an area with a degree of traffic congestion less than a reference value on the driving path to the destination as the waiting area.

9. The method of claim 1, wherein the method further comprises continuously determining whether stopping is allowed in the stopping area based on a preset cycle when a location of the autonomous vehicle is in the waiting area.

10. The method of claim 9, wherein the method further comprises transmitting the driving path to the stopping area to an autonomous vehicle that enters the waiting area at an earliest point in time among the plurality of autonomous vehicles located in the waiting area when the stopping area is in a stopping state.

11. The method of claim 1, further comprising:
when a period during which a location of the autonomous vehicle is the waiting area is greater than or equal to a preset period, changing the stopping area into an adjacent stopping area; and
generating a driving path to the adjacent stopping area and transmitting the generated driving path to the autonomous vehicle.

12. The method of claim 1, wherein the method further comprises changing the stopping area into an adjacent stopping area when non-stopping signals are received from the autonomous vehicle.

13. The method of claim 11, wherein the method further comprises transmitting information on the changed adjacent stopping area to the user terminal.

14. The method of claim 1,
wherein setting the waiting area on the driving path to the destination, generating the driving path to the set waiting area, and transmitting the generated driving path to the autonomous vehicle comprise identifying non-occupied waiting points that are not occupied among the plurality of waiting points (wp), generating a driving path to any one non-occupied waiting point closest to the destination among the identified non-occupied waiting points, and transmitting the generated driving path to the autonomous vehicle.

15. The method of claim 1, wherein the autonomous vehicle, which is moving autonomously along the driving path to the stopping area or the waiting area, transmits an occupancy prediction signal for the stopping area or the waiting area to an adjacent vehicle through vehicle-to-vehicle (V2V) communication.

16. The method of claim 12, wherein the method further comprises transmitting information on the changed adjacent stopping area to the user terminal.

* * * * *